(12) United States Patent
Ichiyama

(10) Patent No.: US 6,657,343 B2
(45) Date of Patent: Dec. 2, 2003

(54) MAGNETIC FLUID BEARING MOTOR EMPLOYING POROUS SLEEVE

(75) Inventor: Yoshikazu Ichiyama, Kyoto (JP)

(73) Assignee: Kura Laboratory Corporation, Kyoto (JP)

(*) Notice: Subject to any disclaimer, the term of this patent is extended or adjusted under 35 U.S.C. 154(b) by 0 days.

(21) Appl. No.: 09/788,547

(22) Filed: Feb. 21, 2001

(65) Prior Publication Data
US 2002/0079766 A1 Jun. 27, 2002

(30) Foreign Application Priority Data
Dec. 26, 2000 (JP) ...................... 2000-394370

(51) Int. Cl.[7] .............................................. H02K 7/09
(52) U.S. Cl. ...................................... 310/90.5; 310/90
(58) Field of Search .................................. 310/90.5, 90

(56) References Cited

U.S. PATENT DOCUMENTS 4,645,960 A * 2/1987 Hoffman .................... 310/90.5
6,340,854 B1 * 1/2002 Jeong ........................ 310/90

FOREIGN PATENT DOCUMENTS

| JP | 59-126114 | 7/1984 | |
|----|-----------|--------|---|
| JP | 3-49416 | 5/1991 | |
| JP | 6-341434 | 12/1994 | |
| JP | 10-159849 | * 11/1997 | ............ H02K/7/09 |
| JP | 10-292819 | 11/1998 | |
| JP | 11-13765 | 1/1999 | |

* cited by examiner

Primary Examiner—Thanh Lam
(74) Attorney, Agent, or Firm—Armstrong, Westerman & Hattori, LLP (57) ABSTRACT

A magnetic fluid bearing motor provided with a bearing assembly, the bearing assembly comprising a shaft, a substantially solid porous sleeve, magnetic fluid oil, and the like, wherein the shaft or the sleeve is formed of a ferromagnetic substance, and the surface of the shaft or the sleeve is locally magnetized such that the magnetization-varying portion is so arranged as to correspond to the bearing portion. Inside the porous sleeve is formed magnetic flux density gradient which is set at the maximum on the bearing surface, and thereby oil diluted with air bubbles is divided into dense and rarefied portions so as to retain a proper amount of oil with sufficiently high viscosity in the bearing portion. With the above stated structure, an inexpensive and long-wearing motor can be attained.

6 Claims, 6 Drawing Sheets

MAGNETIC FLUID BEARING MOTOR EMPLOYING POROUS SLEEVE

BACKGROUND OF THE INVENTION

1. Field of the Invention

The present invention relates to a magnetic fluid bearing motor, and more particularly to a magnetic fluid bearing motor in which a long service life and cost reduction are achieved by employing a sleeve made of a porous material.

2. Detailed Description of the Related Art

Recently, bearings made of a porous material have been coming into wider and wider use in motors for recording apparatuses such as magnetic disk units or optical disk units, cooling fan units, and the like. This is because a porous bearing is excellent in moldability and thereby cost reduction is achieved with ease. Moreover, a technique has been developed that allows reduction in the hole rate of the surface of a bearing portion by forming a groove for generating dynamic pressure during molding. Such a technique started being applied to dynamic-pressure bearing motors.

However, a porous bearing has the following disadvantages. At a high-speed rotation, oil seeps out of the high-oil-pressure side of the bearing portion into the porous sleeve, but the flow rate of the oil flowing back to the low-oil-pressure side thereof is insufficient. This tends to cause running short of oil. Furthermore, if the loss of oil occurs in the bearing portion, in the oil carrying mechanism based on surface tension or diffusion process, the oil is diluted with air bubbles and thus the viscosity of the oil is substantially lowered. This causes serious problems in the dynamic-pressure generating function at a relatively early stage of operation.

To attain a desired dynamic-pressure generating function by using a combination of a porous sleeve and a dynamic-pressure bearing, it is necessary to achieve, with a simple construction, such as means for securing a flow passage through which the oil penetrated from the high-oil-pressure side of the bearing portion flows back to the low-oil-pressure side thereof without being scattered, and means for concentrating the oil held in the porous sleeve on the bearing portion and letting air bubbles remain around the outer circumference in a case of the loss of oil occurring in the bearing portion.

Although some attempts were made in the past to retain oil in the bearing portion reliably by using magnetic fluid oil as lubricating oil and using a magnet or the like, any of those attempts yielded no satisfactory results. For example, U.S. Pat. No. 3,746,407 proposes that a dynamic-pressure bearing portion and magnetic fluid oil are arranged inside a magnetic circuit of a magnet. Furthermore, Japanese Patent Laid-Open Publication No. Hei. 6-341434 proposes that a bearing portion, a porous material, magnetic fluid oil, and others are arranged inside a magnetic circuit of a magnet to retain the oil in the bearing portion. Japanese Utility Model Laid-Open Publication No. Hei. 3-49416 proposes that a porous sleeve formed of a ferromagnetic substance is magnetized to retain magnetic fluid oil inside the sleeve.

However, oil-retaining mechanisms as proposed in the above-mentioned patent applications aim at simply retaining oil around a bearing portion and pay no regard to methods for securing a proper quantity of oil which circularly flows and for maintaining the viscosity of the oil held in the bearing portion by forming three-dimensional concentration gradient inside the porous sleeve in consideration of the existence of oil diluted with air bubbles. This causes a dynamic-pressure bearing to suffer from critical defects. Furthermore, a bearing structure in which a magnetic circuit is formed requires a large number of associated parts, such as a magnet, and is thus not suitable for use in low-cost products.

SUMMARY OF THE INVENTION

In view of the foregoing, an object of the present invention is to provide a magnetic fluid bearing motor that has a long service life and requires less cost in which concentration gradient of oil is formed by realizing magnetic field gradient with a simple construction inside the porous sleeve.

According to the present invention, a magnetic fluid bearing motor is provided with a bearing assembly composed of a shaft, a substantially solid porous sleeve moving in rotation relatively to the shaft with a minute gap provided therebetween, and magnetic fluid oil, wherein one or more bearing surfaces of the sleeve corresponding to a radial bearing, a thrust bearing, and the like, or the shaft is magnetized to create magnetic flux density gradient inside the porous sleeve, the magnetic flux density gradient being set at the maximum on the bearing surface.

More specifically, a magnetization pattern is created on the shaft formed of a ferromagnetic substance such that the magnetization-varying portion is so located as to correspond to the bearing portion. Otherwise a magnetization pattern is created on the porous sleeve formed of a ferromagnetic substance such that the magnetization-varying portion is so located as to correspond to the surface of the bearing portion.

Moreover, a magnetization pattern to be created on the bearing surface of the sleeve or the shaft is so controlled that, in the spiral- or herringbone-shaped dynamic-pressure generating groove, the magnetization-varying portion is so located as to correspond to the oil-admission end thereof.

Since the leakage of the magnetic flux from the magnetization is diffused, three-dimensional magnetic flux density gradient is formed inside the porous sleeve. The farther the magnetic flux density gradient lies away from the sleeve surface of the bearing portion, the smaller it becomes. This means that, since a magnetic substance is generally driven to be attracted toward a direction in which magnetic flux density is made high, a field of force is created for driving the magnetic fluid oil to be attracted toward the bearing portion.

Accordingly, since the porous sleeve has been impregnated with magnetic fluid oil, the less the quantity of the magnetic fluid oil due to evaporation, migration, or other reasons, the more the magnetic fluid oil is collected in the vicinity of the bearing portion of the sleeve and air bubbles remain in the outer peripheral portion thereof, i.e., the oil has dense and rarefied portions. This makes it possible to retain the magnetic fluid oil reliably in the bearing portion without it being diluted with air bubbles.

The porous sleeve is not so designed that only the bearing portion is made of a porous material but so designed that the entire structure thereof including unnecessary parts provided around the bearing portion is substantially made of a single porous material. Setting the volume of the porous sleeve at the maximum allows the range of magnetic fluid oil capacity to be made larger, and thereby the magnetic fluid oil can be divided into dense and rarefied portions in the radial or axial direction. This makes it possible to secure as large available magnetic fluid oil quantity as possible.

BRIEF DESCRIPTION OF THE DRAWINGS

The above and other objects, features and advantages of the present invention will be apparent from the following detailed description of the preferred embodiments of the invention in conjunction with the accompanying drawings, in which.

PREFERRED EMBODIMENTS OF THE INVENTION

Hereinafter, principles of operation, embodiments, and the like of the present invention will now be described in detail below with reference to the accompanying drawings.

Figure 1:
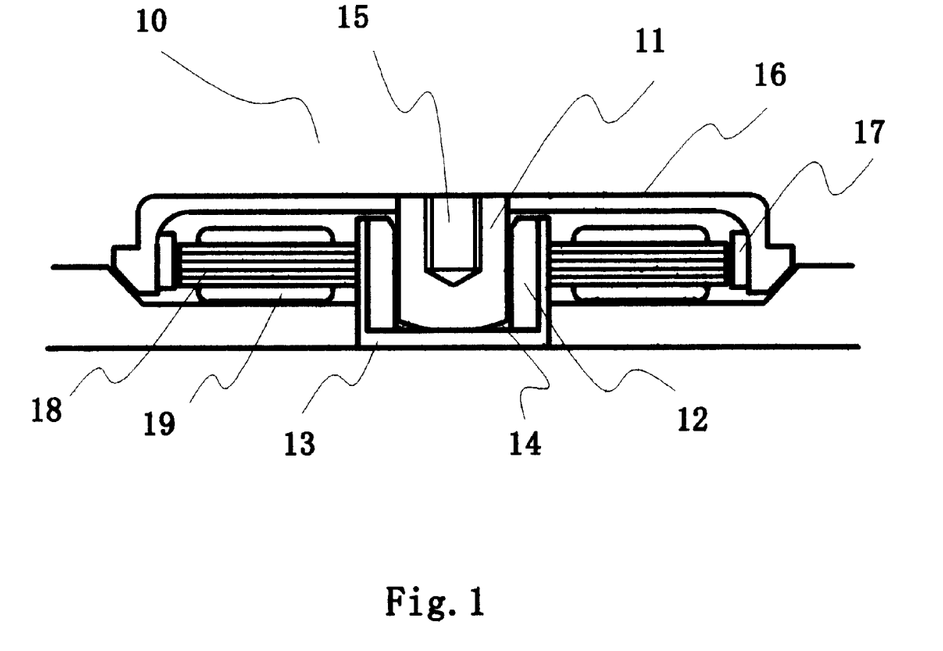
FIG. 1 is a sectional view illustrating a magnetic fluid bearing motor of a first embodiment of the present invention.

FIG. 1 is a sectional view of a magnetic fluid bearing motor 10 of a first embodiment of the present invention, illustrating the construction applied to a dynamic-pressure bearing. In FIG. 1, a shaft 11, a sleeve 12 faced to the shaft 11 with a gap extending radially about 2 $\mu$m provided therebetween, and magnetic fluid oil 14 constitute a radial-direction dynamic-pressure bearing. The end of the shaft 11 is convex at its center and is formed into a thrust-direction pivot bearing. The sleeve 12 is made of porous sintered alloy including a ferromagnetic material and contains magnetic fluid oil inside, the sleeve 12 being housed within an aluminum housing 13. The housing 13 making sliding contact with the end of the shaft 11 has its surface ceramic-plated to reduce abrasions.

A gap provided between the shaft 11 and the sleeve 12 is so shaped that its width increases gradually toward the opening portion to form a sealing portion in which surface tension is exploited. An oil repelling agent is applied to the surface thereof. A hub 16 coupled to the shaft 11 has a rotor magnet 17 fixed thereto so as to be axially and slightly upwardly deviated from a stator core 18, whereby a downward force is generated in the rotary portions including the hub 16 and the shaft 11. Reference numeral 19 represents a coil, and 15 represents a screw hole for securely holding a magnetic disk to be mounted.

Figures 2A, 2B:
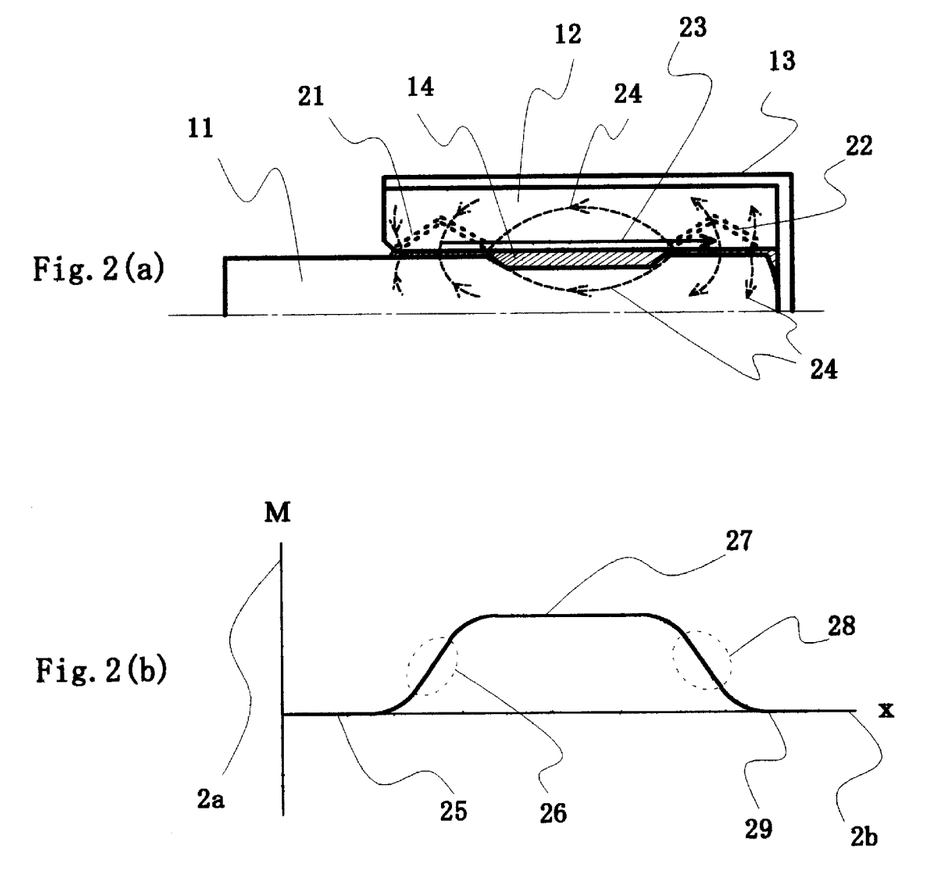
FIGS. 2(a) and 2(b) are views for explaining the dynamic-pressure bearing of the first embodiment of the present invention, with FIG. 2(a) showing the cross section of the shaft and the sleeve, and FIG. 2(b) showing the magnetization distribution on the bearing surface of the sleeve.

FIGS. 2(a) and 2(b) are views for explaining the principles of operation of the present invention, illustrating half of the enlarged cross sections of the shaft 11, the sleeve 12, the housing 13, the magnetic fluid oil 14, and others provided in the magnetic fluid bearing motor 10 shown in FIG. 1. In FIG. 2(a), two radial bearing portions and a single pivot bearing portion constitute a bearing assembly. On the bearing surface of the sleeve 12 are formed herringbone-shaped grooves 21 and 22. As indicated by an arrow, there remains magnetization 23 on the surface of the bearing portion such that the grooves 21 and 22 are so located as to correspond to the magnetization-varying portions. The flow of a magnetic flux resulting from the magnetization 23 is indicated by a dotted line 24. The leakage of the magnetic flux 24 from the magnetization-varying portions located at both ends of the magnetization 23 is diffused with its magnetic flux density set at the maximum on the surface of the sleeve 12, with the result that magnetic flux density gradient is formed inside the sleeve 12. This means that, since the magnetic fluid oil is attracted toward a direction in which the magnetic flux density is made higher, a field of force is created for driving the magnetic fluid oil to be attracted toward the vicinity of both ends of the magnetization 23. In FIG. 2(b), the direction x of the length of the sleeve 12 is taken along the abscissa axis 2b, and the magnetization strength M is taken along the ordinate axis 2a. Moreover, the magnetization distribution on the bearing surface of the sleeve 12 is indicated numerals 25, 26, 27, 28, and 29.

Numerals 25 and 29 each indicate the state in which the magnetization is substantially nil, and numeral 27 indicates the maximum magnetization. Numerals 26 and 28 each indicate a magnetization-varying portion. Since a magnetic flux mostly leaks from the magnetization-varying portions 26 and 28, the magnetization 23 is formed on the bearing surface of the sleeve such that the magnetization-varying portions 26 and 28 are so located as to correspond to the grooves 21 and 22, respectively. In a case where the grooves 21 and 22 are made so long that it is difficult to allow the magnetization-varying portions to correspond to the overall length of the grooves, a magnetization pattern is created such that magnetization reversal is repeated on a short-period basis subsequently to the formation of the magnetization 23.

In FIG. 2(a), the grooves 21 and 22 are each realized as a concave portion having a depth of about 5 $\mu$m, and allow the magnetic fluid oil 14 flowing with the rotary motion of the shaft 11 at both ends and increase pressure in the central portion so as to support the shaft 11 and the sleeve 12. In the sleeve 12 made of a porous material, the grooves 21 and 22 are formed by molding, and the surface is compacted so as to set the hole rate of the area in the vicinity of the bearing portion as small as possible. Such a design facilitates increase in pressure. Accordingly, the oil collected in the central portion of the grooves 21 and 22 is under increasingly high pressure and travels with a flow that seeps out of the surface of the sleeve 12. Further descriptions will be given below in this connection with reference to FIGS. 3(a) and 3(b) that are enlarged views of the groove 21 and its vicinity.

Figure 3A:
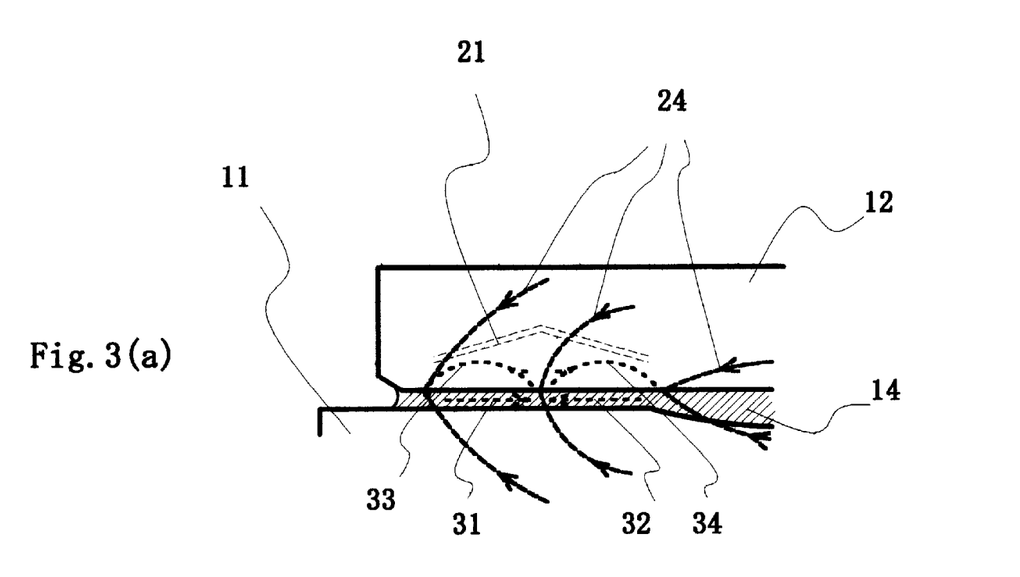
FIGS. 3(a) and 3(b) are views illustrating the flow of the magnetic fluid oil observed in the vicinity of the groove shown in FIGS. 2(a) and (b)
Figure 3B:
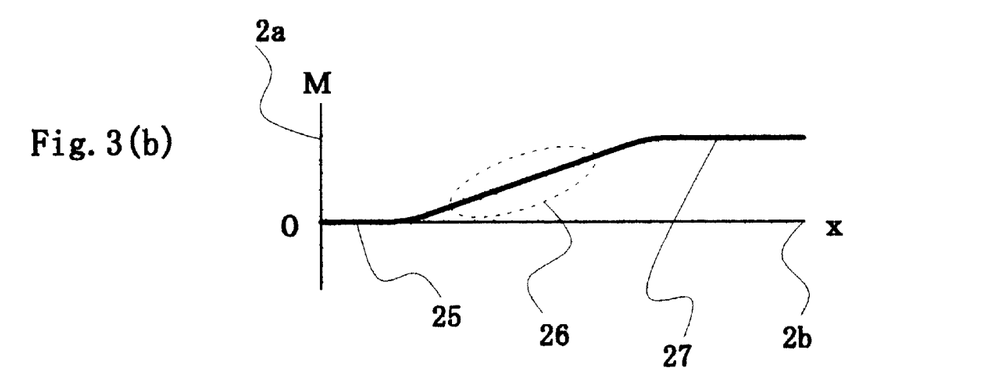

FIG. 3(a) is an enlarged view for explaining the flow of the magnetic fluid oil 14 observed in the vicinity of the groove 21, and FIG. 3(b) is a view showing the corresponding magnetization distribution. As seen from these figures, the bearing surface of the sleeve 12 is magnetized such that a varying portion 26 of the remaining magnetization 23 is so located as to correspond to the groove 21. As the shaft 11 is rotated, the groove 21 drives the magnetic fluid oil 14 collected at its both ends to flow toward the central portion, with the result that the magnetic fluid oil 14 travels with a flow as indicated by dotted lines 31 and 32. The magnetic fluid oil 14 indicated by the dotted lines 31 and 32 is pressed against the approximately central portion of the groove 21, whereby pressure is increased. Simultaneously, the magnetic fluid oil 14 seeps out of holes remaining on the surface of the porous sleeve 12 into the sleeve 12. Therefore, as indicated by dotted lines 31–33 and 32–34, circulating flows of the magnetic fluid oil 14 occur around the groove 21.

These circulating flows 33 and 34 are under the influence of surface tension or diffusion process. Thus, in a conventional construction, the flow rate cannot be expected to be sufficient and there is the possibility that the oil will become depleted in the bearing portion earlier than expected after the rotation operation. In the embodiments of the present invention, since the magnetic flux density gradient resulting from the magnetization-varying portion 26 of the bearing surface of the sleeve 12 is set at the maximum in the vicinity of the groove 21, the flow of the magnetic fluid oil 14 indicated by numerals 33, 34, and others is permitted to remain in the vicinity of the groove 21. This helps secure a necessary amount of oil which flows back. Note that the viscosity of oil plays an important role particularly in generating dynamic pressure, and it is impossible to generate sufficiently high dynamic pressure with oil diluted with air bubbles. With this in mind, in the present invention, by forming magnetic flux density gradient, it is possible to allow the magnetic fluid oil 14 to have dense and rarefied portions. Specifically, the portion of oil found in the vicinity of the groove 21 provided inside the sleeve 12 is made dense, and the portion found between the outer peripheral portion and the grooves 21 and 22 is made rarefied. By doing so, even though a loss in the quantity of the magnetic fluid oil 14 is caused for some reason or other, it is possible to retain the magnetic fluid oil 14 having a sufficiently high viscosity in the vicinity of the groove 21, and thus it never occurs that the mechanism for generating dynamic pressure is adversely affected.

Note that, as a ferromagnetic porous material used for forming the sleeve 12, a variety of known materials can be employed. For example, the sleeve may be realized by the use of copper-based alloy suitable for use in a sliding bearing blended with aluminum, nickel, and cobalt alloy powder. With regard to a ferromagnetic material used for forming the sleeve, practicable magnetic fluid oil is made to exert saturation magnetic flux density of about 400 gauss, and therefore it is not necessary to employ an extra high-intensity magnet material additionally. Moreover, as shown in FIGS. 2(a) and 3(a), a magnetization pattern to be created on the bearing surface of the sleeve 12 needs to be shaped such that the boundary of the magnetization-varying portion is aligned with the rotation direction of the shaft 11. This conforms to the direction of the flow of the magnetic fluid oil 14 occurring with the rotation. Consequently, not only it is possible to avoid having adverse effects on the dynamic-pressure generating mechanism, but it is also possible to minimize unnecessary loss of the oil.

As described heretofore, in this construction, the magnetic fluid oil can be concentrated on the bearing portion by creating magnetic flux density gradient inside the sleeve. It is therefore preferable to adopt a sleeve-shaped construction capable of containing as large quantity of magnetic fluid oil as possible. As shown in FIGS. 2(a) and 2(b), a construction formed of a solid porous material in which the largest permissible quantity of magnetic fluid oil can be contained serves the purpose of the present invention and is advantageous from a cost standpoint.

Figure 4A:
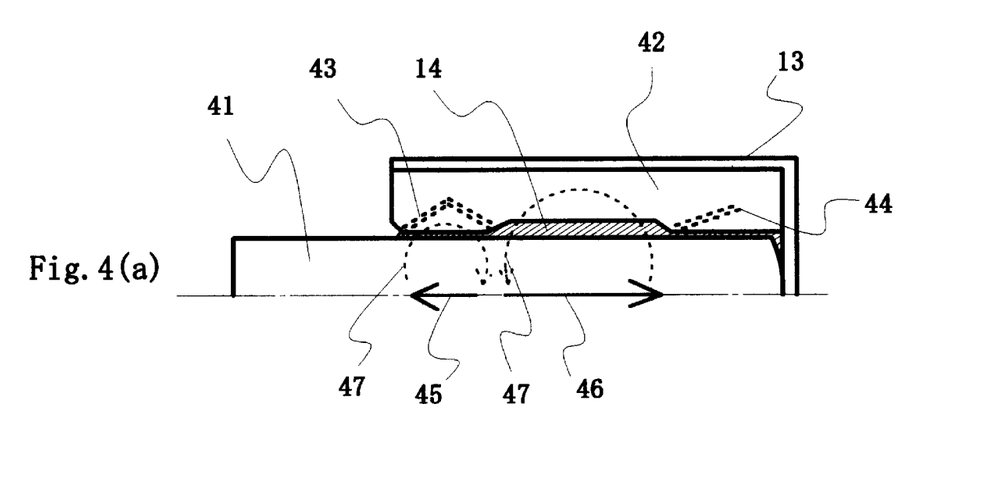
FIGS. 4(a) and 4(b) are views for explaining a dynamic-pressure bearing of a second embodiment of the present invention, with FIG. 4(a) showing the cross section of the shaft and the sleeve, and FIG. 4(b) showing the magnetization distribution in the shaft.
Figure 4B:
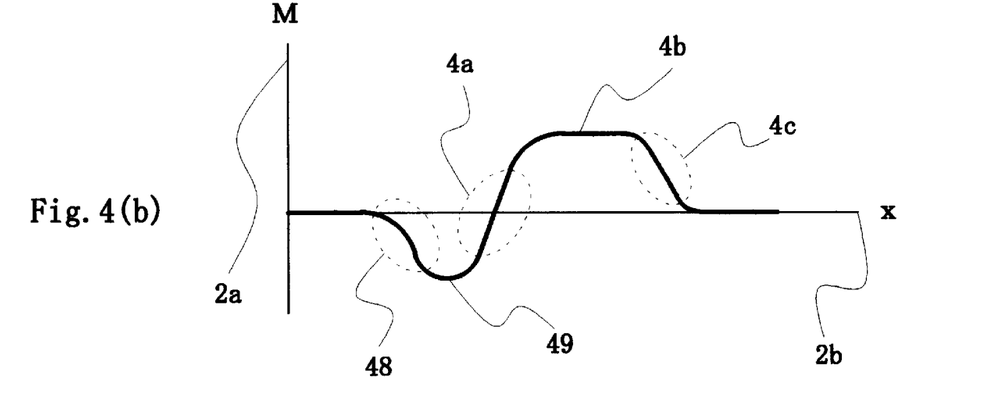

FIGS. 4(a) and 4(b) are views of assistance in explaining a second embodiment of the present invention. The dynamic-pressure bearing of the second embodiment is constructed basically in the same manner as that of the first embodiment except that, in the former, the shaft is formed of a ferromagnetic substance and is subjected to magnetization, and the magnetization-varying portion is so located as to correspond to the oil admission end of the groove. As seen from the above descriptions using FIGS. 3(a) and 3(b), the magnetic fluid oil 14 circulates with a flow through the passage indicated by dotted lines 31–33 and 32–34. This means that both ends of the groove 21 act as ends for admission of the magnetic fluid oil 14 and that the central portion thereof acts as an oil discharge end. It is therefore to be understood that, to make the most of the functions of the dynamic-pressure bearing, precisely speaking, the oil needs to be collected at both ends of the groove 21, i.e., at the ends for admission of the magnetic fluid oil 14. The second embodiment of the present invention is achieved based on the idea described just above.

In FIGS. 4(a) and 4(b), a sleeve 42 is provided with a herringbone groove 43 and a spiral groove 44. The former has its both ends formed into oil admission ends. The latter has its left end formed into an oil admission end, because the spiral groove 44 is designed to exert a pumping action toward the end of a shaft 41. Accordingly, the shaft 41 made of a ferromagnetic substance is magnetized such that magnetizations 45 and 46 remain with their magnetization-varying portions located at the positions of the oil admission ends of the grooves 43 and 44. Numeral 47 represents the flow of a magnetic flux resulting from the remaining magnetizations 45 and 46. FIG. 4(b) shows, like FIG. 2(b), the distribution of the remaining magnetizations. Numerals 48 and 49, and numeral symbols 4a, 4b, and 4c represent magnetization distribution, of which 48, 4a, and 4c represent magnetization-varying portions.

In this way, the remaining magnetization-varying portions 48, 4a, and 4c are located on the shaft 41 so as to correspond to the oil admission ends of the grooves 43 and 44. Consequently, a field of force is created for achieving concentration of the magnetic fluid oil 14 held inside the sleeve 42, and thereby the circular flow of the magnetic fluid oil 14 is facilitated.

The shaft is realized by the use of an iron-based material that has its surface plated with nickel layers having a thickness of about 5 $\mu$m and has undergone anti-corrosive and abrasion-resistance measures. Moreover, it is possible to use instead a non-magnetic metal, resin, or the like whose surface is coated with ferromagnetic nickel alloy, such as alloy of nickel and cobalt, alloy of nickel, cobalt, and phosphor, by a chemical plating technique. As a result, there is provided a shaft that is highly abrasion-resistant and inexpensive.

Figure 5A:
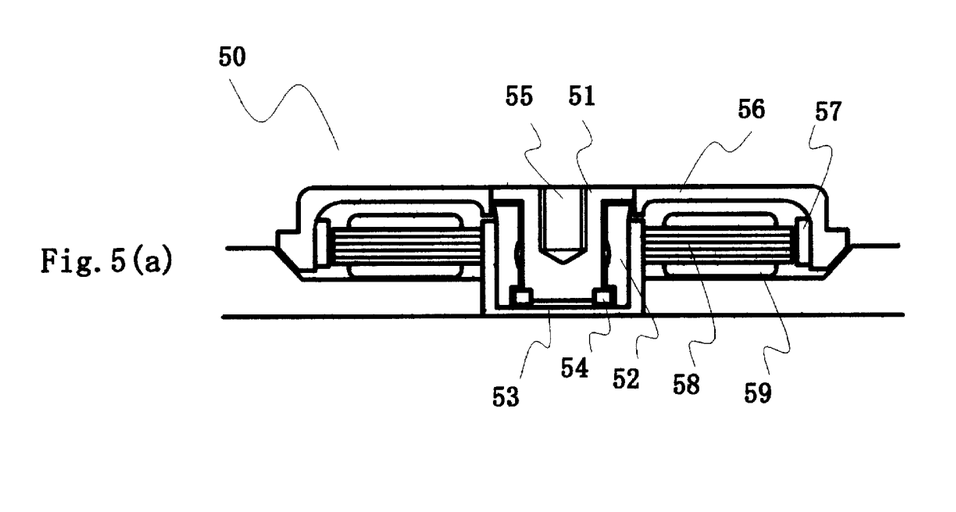
FIGS. 5(a) and 5(b) are views of a third embodiment of the present invention, illustrating the construction applied to a T-shaped shaft, with FIG. 5(a) showing the cross section of the entire system, and FIG. 5(b) showing the principal portion of the bearing portion.
Figure 5B:
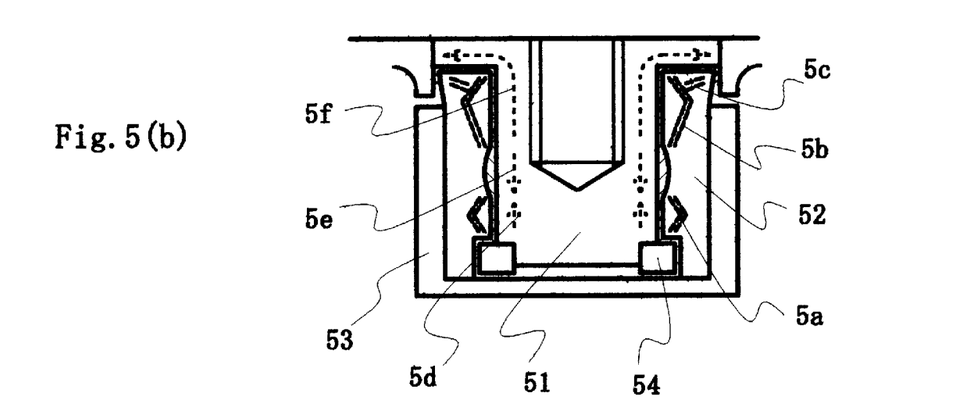

FIGS. 5(a) and 5(b) illustrate a third embodiment of the present invention, with FIG. 5(a) showing a schematic sectional view of the entire system and FIG. 5(b) showing an enlarged view of the bearing assembly employed in the embodiment. In these figures, a magnetic fluid motor 50 is provided with a bearing assembly composed of a shaft 51 having a T-shaped sectional profile, a sleeve 52 faced in rotation to the shaft with a gap provided therebetween, the gap being about 2 $\mu$m long in the radial direction and about 6 $\mu$m long in the thrust direction, a housing 53, a retaining member 54, magnetic fluid oil, and other components. A hub 56 coupled to the shaft 51 is provided with a rotor magnet 57, the rotor magnet 57 being arranged axially deviated upwardly from a stator core 58 to produce a downward force in the rotary portions including the shaft 51 and the hub 56. Reference numeral 59 represents a coil.

The sleeve 52 is formed of a porous sintered material. On its surface faced to the shaft 51 are formed grooves identified with numeral symbols 5a, 5b, and 5c. Each groove has a depth of about 5 μm and in which magnetic fluid oil is impregnated. The groove 5a has a substantially symmetrical herringbone shape and is formed into one side of the radial bearing. The groove 5b has a substantially asymmetrical herringbone shape and exerts a pumping force upwardly, i.e., in the thrust bearing direction. The groove 5c has a pump-in spiral shape. The grooves 5b and 5c are designed to push the magnetic fluid oil away from each other and generate dynamic pressure for the thrust bearing.

The shaft 51 is formed of a ferromagnetic substance. The shaft is subjected to magnetization in such a manner that remaining magnetization 5d is formed thereon with its magnetization-varying portion located so as to correspond to both ends of the groove 5a, and remaining magnetization 5f is formed thereon with its magnetization-varying portion located so as to correspond to both ends of the grooves 5b and 5c. Remaining magnetization 5e is provided for the purpose of increasing the amount of magnetization variation between the remaining magnetizations 5d and 5f arranged adjacent to each other. Moreover, the remaining magnetization 5f is so located as to correspond to the two grooves 5b and 5c for the following reason. Although the grooves 5b and 5c are provided separately for the radial and thrust bearings, they are actually formed contiguously with each other. Therefore, a serial magnetization is formed such that the magnetization-varying portion is so located as to correspond to the portions of the grooves that act as ends for admission of magnetic fluid oil. The remaining magnetization 5f has an L-shaped sectional profile and can be formed with ease by allowing a magnetic coil having an L-shaped sectional profile to come near the shaft 51.

Figure 6:
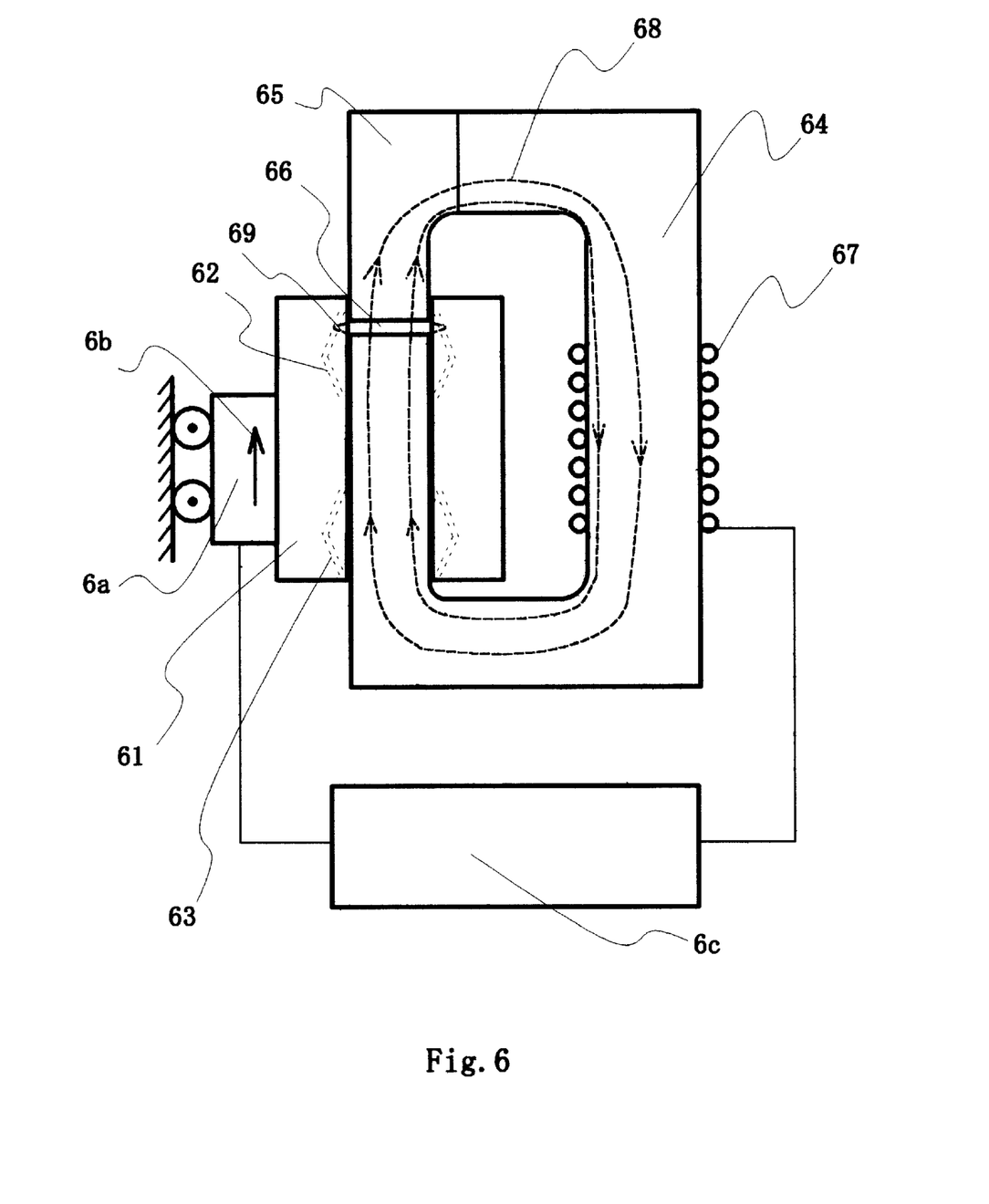
FIG. 6 is a view illustrating an example of manufacturing equipment for performing magnetization on the bearing surface of the sleeve.

FIG. 6 illustrates an example of manufacturing equipment suitable for the magnetic fluid bearing motor of the present invention. In FIG. 6, the manufacturing equipment is composed of a magnetic circuit, an exiting coil 67, a transfer unit 6a for a sleeve 61, a control unit 6c, and other components. The above-mentioned magnetic circuit includes a magnetic core 65 that is made detachable so as to be inserted into the sintered alloy sleeve 61 containing a ferromagnetic substance, a magnetic core 64, a magnetic gap 66, and the like. Reference numerals 62 and 63 represent grooves formed on the bearing surface of the sleeve 61. Numerical symbol 6b represents the movement direction of the transfer unit.

In FIG. 6, the magnetic gap 66 is so arranged as to correspond to the bearing surface of the sleeve 61. When an electric current is applied to the exciting coil 67, a magnetic flux 68 induced into the magnetic circuit is scattered outside through the magnetic gap 66, whereby the surface of the bearing portion of the sleeve 61 is magnetized. The control unit 6c drives the transfer unit 6a to operate and controls the direction, the strength, and the like of an electric current to be fed to the exciting coil 67 in accordance with the relative positions of the sleeve 61 and the magnetic gap 66, and thereby precisely controls the magnetization distribution that will remain on the bearing portion of the sleeve 61.

The extent of the leakage of a magnetic flux toward the sleeve side is substantially proportional to the length of the magnetic gap 66. Therefore, by making the length of the magnetic gap 66 smaller, it is possible to limit a portion to be magnetized to an area in the vicinity of the bearing surface of the sleeve 61, and thus create radial magnetic flux density gradient with ease that is set at the maximum in the vicinity of the bearing surface of the sleeve 61.

The magnetic cores 64 and 65 can be formed of a magnetic material, such as laminated core, ferrite, or the like. The magnetic gap 66 can be formed of resin, metal other than a magnetic substance, or vacant space.

While the structure, the principles of operation, and others of the magnetic fluid dynamic pressure bearing motor of the present invention have been shown and described herein as several preferred embodiments, various changes may be made without departing from the spirit of the present invention.

For example, although the embodiments described above deal only with cases where only one of the sleeve and the shaft is formed of a ferromagnetic material and is magnetized, it is also possible to form the other of them from a magnetic substance having a relatively high magnetic permeability. This contributes to further increase in the magnetic flux density of the bearing portion.

As described previously, while leakage of oil from the open end of the gap provided between the shaft and the sleeve can be suppressed by processing the gap at the open end into a taper shape and applying an oil repelling agent to the surface thereof, it is also possible to achieve a magnetic-field sealing effect by exploiting the property of magnetic fluid oil. For example, arranging a washer made of a magnetic substance at the open end of the gap provided between the shaft and the sleeve helps prevent the magnetic flux resulting from magnetization from being leaked to outside. In addition, forming a magnetic circuit by combining a housing made of a magnetic substance and said washer also achieves effective prevention of oil leakage.

In the first embodiment, the sleeve is formed of a ferromagnetic substance and the bearing surface is locally magnetized. On the other hand, in the second embodiment, the shaft is formed of a ferromagnetic substance and the shaft itself is locally magnetized. What is important in the present invention is to create three-dimensional magnetic flux density gradient inside the porous sleeve. If it is assumed that, in the first embodiment, the shaft is formed of a ferromagnetic substance and a magnetization pattern same as created on the bearing surface of the sleeve is created on the surface of the shaft, it is possible to obtain the same effect. Strictly speaking, however, it is preferable that magnetization be performed on the shaft, because a magnetization pattern cannot be created on the bearing surface of the sleeve without a certain depth.

According to the present invention, there is provided a magnetic fluid bearing motor having a long service life and suitable for a dynamic-pressure bearing in which a porous material is employed to reduce the manufacturing cost, which can be used for recording devices including optical disk units and magnetic disk units, cooling fan units, or the like.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A magnetic fluid bearing motor provided with a bearing assembly, the bearing assembly comprising:
   a shaft formed partly or wholly of a ferromagnetic substance;
   a substantially solid porous sleeve faced in parallel with the shaft forming a bearing portion with a minimum gap provided therebetween; and
   magnetic fluid oil impregnated into the gap and the porous sleeve, wherein a ferromagnetic substance included in the shaft is locally magnetized so as to create magnetic flux density gradient that is set at a maximum along the bearing portion of the porous sleeve and decreases gradually as it stays away therefrom, wherein a boundary of a magnetization-varying portion of the shaft is aligned with a line of a flow of the magnetic fluid oil occurring with rotary motion of the sleeve or the shaft, and wherein the bearing portion has a groove for generating dynamic pressure formed on a surface of the shaft or the sleeve, and a magnetization-varying portion is arranged in a position of the shaft that corresponds to the groove.

2. The magnetic fluid bearing motor as claimed in claim 1, wherein the groove is realized as a herringbone groove, and the magnetization-varying portion of the shaft is arranged in a vicinity of both ends of the herringbone groove.

3. The magnetic fluid bearing motor as claimed in claim 1, wherein the groove is realized as a spiral groove, and the magnetization-varying portion of the shaft is arranged in a vicinity of an oil admission end of the spiral groove.

4. A magnetic fluid bearing motor provided with a bearing assembly, the bearing assembly comprising:

a substantially solid porous sleeve including a ferromagnetic material;

a shaft faced an parallel with the sleeve with a bearing portion with a minimum gap provided therebetween: and magnetic fluid oil impregnated into the gap and the porous sleeve, wherein a surface of the bearing portion of the sleeve is locally magnetized so as to create magnetic flux density gradient that is set at a maximum along the bearing portion of the porous sleeve and decreases gradually as it stays away therefrom, wherein a boundary of a magnetization-varying portion remaining on the surface of the bearing portion of the sleeve is aligned with a line of a flow of the magnetic fluid oil that occurs with rotary motion of the sleeve or the shaft, and wherein the bearing portion has a groove for generating dynamic pressure formed on a surface of the shaft or the sleeve, and a magnetization-varying portion is arranged an a position of the surface of the bearing portion of the sleeve that corresponds to the groove.

5. The magnetic fluid bearing motor as claimed in claim 4, wherein the groove is realized as a herringbone groove, and the magnetization-varying portion of the surface of the bearing portion of the sleeve is arranged in a vicinity of both ends of the herringbone groove.

6. The magnetic fluid bearing motor as claimed in claim 4, wherein the groove is realized as a spiral groove, and the magnetization-varying portion of the surface of the bearing portion of the sleeve is arranged in a vicinity of an oil admission end of the spiral groove.

* * * * *